UNITED STATES PATENT OFFICE.

EDWARD C. HEGELER, OF LA SALLE, ILLINOIS.

FIRE-CLAY RETORT AND BRICK.

No. 826,032.

Specification of Letters Patent.

Patented July 17, 1906.

Application filed March 12, 1906. Serial No. 305,708.

*To all whom it may concern:*

Be it known that I, EDWARD C. HEGELER, of La Salle, in the county of Lasalle and State of Illinois, have invented a certain new and useful Improvement in Fire-Clay Retorts and Bricks, of which the following is a specification.

The invention relates to the art of making fire-clay retorts for zinc-smelting furnaces and bricks for the interior of such furnaces.

The nature of the case does not admit of drawings.

Fire-clays consist principally of alumina and silica, found together in different proportions. For the purposes of this specification I use the term "clay rich in alumina" or "alumina clay" as signifying a clay which contains about thirty-nine per cent. of alumina to about forty-three per cent. of silica and the term "clay rich in silica" or "silica clay" as signifying a clay having about fifty per cent. of silica to thirty-one per cent. of alumina, not intending, however, to be limited to the exact proportions. In accordance with the common way of making retorts and bricks for the interior walls of zinc-furnaces a clay rich in silica is used. The larger part of such clay as it comes from the mine is ground through a mill that crushes it. Then it is passed through a mud-mill, (or pug-mill,) wherein it is mixed with water into a stiff mass, which after coming out of the mill is formed into bales and placed in a kiln-chamber, where it is first dried and then burned by an increased fire until the heat is made as high as it can be with coal in the ordinary way. The clay thus burned is again put into the grinding-mill, together with about two-thirds of its quantity of raw clay from the mine, and then passed through a screen of about two millimeters mesh. The mixture falls into the mud-mill and is mixed with water into a stiff plastic mass, from which the retorts and bricks are molded.

The retorts so made are dried and laid cold into a newly-built zinc-furnace and heated up slowly with the same when first starting to operate it, the furnace being thereafter kept under uninterrupted heat, as required in zinc-smelting.

For replacing broken or burnt-out retorts in the hot zinc-furnace the dry unburnt retorts are first put into a cold kiln and gradually heated therein to a red heat and from that transferred in red-hot state into the hot zinc-smelting furnace in place of the old or disabled ones removed.

Before being built into the walls of the zinc-furnace the bricks are burned in a kiln, as before described.

As I found that in zinc-smelting furnaces with retorts and bricks made of such rich-in-silica clay both were used to the limit of their capacity of bearing heat without damage, and as it was known to me that fire-clays rich in alumina would withstand a higher temperature I caused to be made a zinc-furnace having its inner wall made of brick of such alumina clay used in the usual way. This resulted in the inner wall of such brick shrinking and continuing to shrink to such an extent that a rebuilding of the furnace with brick made of clay rich in silica was found necessary after a few months of operation, and no further attempts to use bricks so made of clay rich in alumina for this purpose were made. When cold after such attempted use, it was found that the rich-in-alumina-clay bricks were in a more perfect state, their shrinkage excepted, than bricks made of the silica clay after being subjected to the same usage.

Retorts made in the ordinary way of the alumina clay must have the same tendency of continuous shrinkage as described of the brick, and the rich-in-silica clays have held themselves in general use for retorts of the Belgian type, resting horizontally by their ends in the furnace.

The object of my improvements is to make the use of a fire-clay rich in alumina practical for making the retorts of and the bricks for use in the interior parts of zinc-smelting furnaces of the Belgian type. I attain this object by using in the composition of raw and burnt clay of which such retorts and bricks are molded the burnt part of such clay burnt at a higher temperature than the highest temperature reached in a zinc-smelting furnace, using a kiln adapted to produce such higher heat—as, for instance, a kiln having a gas-producer and the Siemens regenerative chambers, which appears to be the simplest.

What I claim is—

1. An improvement in retorts or bricks for zinc-smelting furnaces comprising the article made of a mixture of burnt and raw fire-clay rich in alumina and having that part of the clay which is used in the burnt state, burnt at a temperature higher than the highest temperature reached in a zinc-smelting furnace, as specified.

2. In the manufacture of retorts or bricks of a mixture of burnt and raw fire-clay, using a clay rich in alumina and subjecting the burnt portion of such clay previous to the mixture to a temperature higher than the highest temperature reached in the furnace where they are to be used, as specified.

EDWARD C. HEGELER.

Witnesses:
M. A. Boss,
Annie M. Adams.